(12) United States Patent
Kourogi et al.

(10) Patent No.: US 10,317,423 B2
(45) Date of Patent: Jun. 11, 2019

(54) TRAVEL DIRECTION ESTIMATION DEVICE AND TRAVEL DIRECTION ESTIMATION METHOD

(71) Applicants: NATIONAL INSTITUTE OF ADVANCED INDUSTRIAL SCIENCE AND TECHNOLOGY, Tokyo (JP); SITE SENSING INC., Tokyo (JP)

(72) Inventors: Masakatsu Kourogi, Tsukuba (JP); Takeshi Kurata, Tsukuba (JP)

(73) Assignees: NATIONAL INSTITUTE OF ADVANCED INDUSTRIAL SCIENCE AND TECHNOLOGY, Tokyo (JP); SITE SENSING INC., Tokyo (JP)

( * ) Notice: Subject to any disclaimer, the term of this patent is extended or adjusted under 35 U.S.C. 154(b) by 272 days.

(21) Appl. No.: 15/109,872

(22) PCT Filed: Jan. 8, 2015

(86) PCT No.: PCT/JP2015/050371
§ 371 (c)(1),
(2) Date: Sep. 29, 2016

(87) PCT Pub. No.: WO2015/105146
PCT Pub. Date: Jul. 16, 2015

(65) Prior Publication Data
US 2017/0023604 A1    Jan. 26, 2017

(30) Foreign Application Priority Data
Jan. 8, 2014 (JP) .................................. 2014-001364

(51) Int. Cl.
*G01P 3/00* (2006.01)
*G01P 13/00* (2006.01)
(Continued)

(52) U.S. Cl.
CPC .............. *G01P 13/00* (2013.01); *G01C 21/16* (2013.01); *G01P 3/00* (2013.01); *G01P 15/00* (2013.01); *G08G 1/005* (2013.01)

(58) Field of Classification Search
CPC . G01P 13/00; G01P 3/00; G01P 15/00; G01C 21/16; G08G 1/005
See application file for complete search history.

(56) References Cited

U.S. PATENT DOCUMENTS

2013/0166137 A1* 6/2013 Ahn ........................ G06F 11/30
701/32.3
2015/0211863 A1    7/2015 Kourogi et al.

FOREIGN PATENT DOCUMENTS

JP    2009-156660    7/2009
JP    2010-112854    5/2010
(Continued)

OTHER PUBLICATIONS

International Preliminary Report on Patentability for corresponding International Application No. PCT/JP2015/050371 dated Jul. 12, 2016.
(Continued)

*Primary Examiner* — Matthew G Marini
(74) *Attorney, Agent, or Firm* — Renner Otto Boisselle & Sklar, LLP

(57) ABSTRACT

The present invention provides a device and a method which allow a travel direction of a moving body to be estimated more efficiently. The present invention provides a travel direction estimating device for estimating a traveling direction in which a moving body travels, including: an accelerometer for detecting an acceleration by which the moving body travels; an angular velocity sensor for detecting an angular velocity by which the moving body travels; and a travel direction vector determining section for determining the traveling direction of the moving body by calculating, (Continued)

based on the acceleration detected by the accelerometer and on the angular velocity detected by the angular velocity sensor.

2 Claims, 6 Drawing Sheets

(51) Int. Cl.
*G01C 21/16* (2006.01)
*G01P 15/00* (2006.01)
*G08G 1/005* (2006.01)

(56) References Cited

FOREIGN PATENT DOCUMENTS

| JP | 2011-237452 | 11/2011 |
|----|-------------|---------|
| JP | 2011-245285 | 12/2011 |
| JP | 2012-145457 | 8/2012 |
| WO | WO 2014/010727 A1 | 1/2014 |

OTHER PUBLICATIONS

International Search Report for corresponding International Application No. PCT/JP2015/050371 dated Apr. 14, 2015.

Kourogi et al., "Indoor/Outdoor positioning of handheld devices based on pedestrian dead reckoning"; IEICE pp. 171-176 (2011) and partial English translation.

Kourogi et al., "Indoor positioning system using a self-contained sensor module for pedestrian navigation and its evaluation", Compilation of Abstracts of Papers for Symposium "Mobile 08", pp. 151-156, (2008) and partial English translation.

"Pedestrian Dead Reckoning using Smartphones"; vol. 54, No. 6, Jun. 2013 and partial English translation.

\* cited by examiner

TRAVEL DIRECTION ESTIMATION DEVICE AND TRAVEL DIRECTION ESTIMATION METHOD

TECHNICAL FIELD

The present invention relates to a technology for estimating a travel direction of a moving body such as a pedestrian.

BACKGROUND ART

Conventionally, there have been proposed techniques in each of which a moving direction of a moving body with respect to a world coordinate system is estimated, based on measured data obtained by a sensing device, such as an accelerometer, a magnetometer, a gyro, or a pressure sensor, which is included in a device held by a moving body such as a pedestrian (Non-Patent Literature 1).

In order to estimate a moving direction of a moving body with respect to a world coordinate system, it is necessary to simultaneously estimate the following three vectors in a sensor coordinate system of a sensing device: (1) a gravitational direction vector, (2) a horizontal reference direction vector which indicates a true north direction or the like, and (3) a travel direction vector. By estimating (tracking) the vectors (1) through (3), it is possible to estimate an angle between the horizontal reference direction and a travel direction. This allows a movement azimuth of the moving body to be estimated.

The gravitational direction vector (1) above can be obtained by tracking a gravitational direction in the sensor coordinate system to be tracked, based on three-axis data supplied from each of an accelerometer and an angular velocity sensor. The horizontal reference direction vector (2) above can be obtained by tracking a horizontal reference direction by use of an accelerometer, an angular velocity sensor, and a magnetometer. For example, Non-Patent Literature 1 specifically discloses a method of tracking a gravitational azimuth vector and a horizontal reference direction vector. There is also a known method which is based on a so-called AHRS (Attitude and Heading Reference System).

The travel direction vector (3) above poses technical problems which largely vary, depending on whether (i) a sensing device is fixed to a foot or the waist of a pedestrian serving as a moving body or (ii) a pedestrian flexibly changes an attitude in which to hold a device included in a sensing device.

For example, in a case where a sensing device is fixed, a position of the sensing device in relation to a pedestrian is fixed. This causes a result of tracking a travel direction of the moving body to be substantially known, and therefore allows the tracking to be relatively easy. However, in a case where there are flexible changes in a position and an attitude in which a sensing device is to be held, tracking of a travel direction is not easy.

Therefore, although various methods have been proposed for estimating a travel direction (Patent Literature 1 and Patent Literature 2), these methods could not accurately estimate a travel direction.

With regard to patterns of acceleration components and angular velocity components of a walking motion of a person, Non-Patent Literature 2 discloses frequency characteristics of components as shown in the following Table 1, which components are obtained by resolving an acceleration vector (three axes) and an angular velocity vector (three axes) each in (i) a travel direction of the walking motion, (ii) a vertical direction (gravitational direction), and (iii) a right-left direction (horizontal direction) which is orthogonal to the travel direction and to the vertical direction.

TABLE 1

| | Acceleration component | Angular velocity component |
|---|---|---|
| Vertical direction axis (yaw axis) | Walking frequency | Walking frequency × ½ |
| Right-left direction axis (pitch axis) | Walking frequency × ½ | Walking frequency |
| Travel direction axis (roll axis) | Walking frequency | Walking frequency × ½ |

That is, in a case where an acceleration vector and an angular velocity vector can each be resolved into components so as to meet properties as shown in Table 1, it is possible to assume that directions, in which the vectors are resolved into the components, are an accurate travel direction and an accurate right-left direction (horizontal direction).

Non-Patent Literature 2 proposes an algorithm for estimating a travel direction, which algorithm causes an azimuth to be continuously changed by only as much a resolution as necessary.

CITATION LIST

Patent Literature

[Patent Literature 1]
Japanese Patent Application Publication, Tokukai No. 2009-156660
[Patent Literature 2]
Japanese Patent Application Publication, Tokukai No. 2011-237452

Non-Patent Literature

[Non-Patent Literature 1]
"Indoor positioning system using self-contained sensor module for pedestrian navigation and its evaluation" in Compilation of Abstracts of Papers for Symposium "Mobile 08", pp. 151-156, (2008)
[Non-Patent Literature 2]
"Indoor/Outdoor positioning of handheld devices based on pedestrian dead reckoning" in Shingaku Giho, MVE2010-96, pp. 171-176 (2011)

SUMMARY OF INVENTION

Technical Problem

However, in a case where a method of searching for a true travel direction by changing as a parameter an azimuth orthogonal to a gravitational direction is employed as an algorithm for estimating a travel direction, there arise problems such as large calculation costs and extended period of time for estimating a travel direction.

The present invention has been made in view of the problems, and it is an object of the present invention to provide a device and a method which allow a travel direction of a moving body to be estimated more efficiently.

Solution to Problem

In order to attain the object, the present invention provides a travel direction estimating device for estimating a traveling direction in which a moving body travels, including: an acceleration detecting section for detecting an acceleration by which the moving body travels; an angular velocity detecting section for detecting an angular velocity by which the moving body travels; and a travel direction determining section for determining the traveling direction of the moving body by (i) calculating, based on the acceleration detected by the acceleration detecting section and on the angular velocity detected by the angular velocity detecting section, an objective function which corresponds to at least one of the following (a) and (b): (a) sizes of acceleration components of the moving body while in respective of the traveling direction and an orthogonal direction orthogonal to the traveling direction on a horizontal plane and (b) sizes of angular velocity components of the moving body while in respective of the traveling direction and the orthogonal direction, (ii) calculating directions in which the objective function is at a maximum level, and (iii) selecting the traveling direction from the directions in accordance with a difference in phase between (a) a vertical direction component of the acceleration of the moving body and (b) a component of the traveling direction of the acceleration.

In order to attain the object, the present invention also provides a method of estimating a traveling direction of a moving body, including the steps of: (A) setting an objective function which corresponds to at least one of the following (a) and (b): (a) sizes of acceleration components of the moving body while in respective of the traveling direction and an orthogonal direction orthogonal to the traveling direction on a horizontal plane and (b) sizes of angular velocity components of the moving body while in respective of the traveling direction and the orthogonal direction; (B) calculating travel directions of the moving body in which travel directions the objective function is at a maximum value; and (C) selecting, in accordance with a difference in phase between (a) a vertical direction component of the acceleration of the moving body and (b) a component of the traveling direction of the acceleration, an estimated traveling direction of the moving body from the travel directions calculated in the step (B).

Advantageous Effects of Invention

With the present invention, it is possible to provide a travel direction estimating device and a travel direction estimating method, each of which allows a travel direction of a moving body to be estimated more efficiently than is the case of a conventional device/method, that is, with reduced processing cost and at high speed.

DESCRIPTION OF EMBODIMENTS

Figure 1:
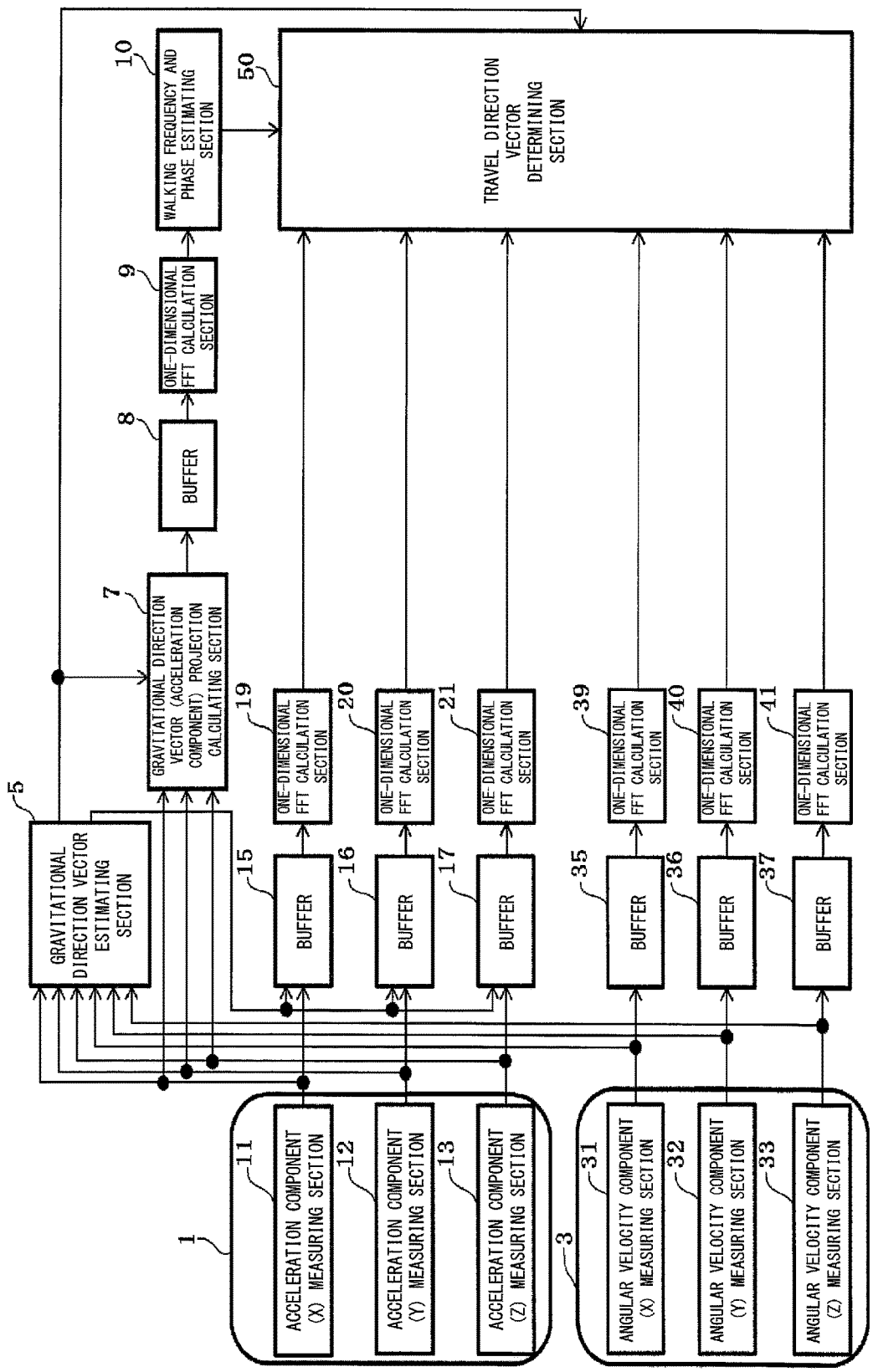
FIG. 1 is a block diagram illustrating a configuration of a travel direction estimating device in accordance with an embodiment of the present invention.

The following description will discuss the details of an embodiment of the present invention with reference to the drawings. Note that identical reference signs in the drawings indicate identical or equivalent parts.

FIG. 1 is a block diagram illustrating a configuration of a travel direction estimating device in accordance with the embodiment of the present invention, which travel direction estimating device estimates a travel direction of a moving body.

The travel direction estimating device illustrated in FIG. 1 includes an accelerometer (three-axis) 1 and an angular velocity sensor (three-axis) 3 as measuring sections. The accelerometer (three-axis) 1 and the angular velocity sensor (three-axis) 3 are attached to a terminal device, such as a smartphone or a mobile device, which is held or worn by a moving body such as a pedestrian. Although these sensors do not necessarily need to be able to obtain outputs in a shared coordinate system, it is herein assumed that conversions of coordinates are ultimately carried out so as to allow the outputs to be handled in a shared Cartesian coordinate system (X/Y/Z-axis).

The accelerometer includes an acceleration component (X) measuring section 11, an acceleration component (Y) measuring section 12, and an acceleration component (Z) measuring section 13, which measure and output respective pieces of acceleration vector component data concerning an X-axis, a Y-axis, and a Z-axis, respectively, of a sensor coordinate system in which an attitude angle relative to a moving body is known. The angular velocity sensor includes an angular velocity component (X) measuring section 31, an angular velocity component (Y) measuring section 32, and an angular velocity component (Z) measuring section 33, which likewise measure and output respective pieces of angular velocity component data concerning the X-axis, the Y-axis, and the Z-axis, respectively. Neither the acceleration vector component data nor the angular velocity vector component data necessarily needs to be component data outputted from a sensor. For example, the acceleration vector component data and the angular velocity vector component data can be data which has been obtained by correcting offsets and/or sensitivity of an acceleration vector and an angular velocity vector, respectively and which is outputted from a sensor. Such correction can be achieved as correction of temperature compensation by a temperature sensor that is separately included.

A gravitational direction vector estimating section 5 estimates a gravitational direction vector in the sensor coordinate system of the travel direction estimating device. Specifically, the gravitational direction vector estimating section 5 estimates the gravitational direction vector, based on an acceleration vector and an angular velocity vector which have been obtained from measured data of the accelerometer (three-axis) 1 and the angular velocity sensor (three-axis) 3, respectively. The gravitational direction vector estimating section 5 then outputs the gravitational direction vector. Such a process can be achieved by a conventional method.

A gravitational direction vector (acceleration component) projection calculating section 7 receives (i) acceleration components of the respective three axes, which acceleration components have been supplied from the accelerometer (three-axis) 1 and (ii) the gravitational direction vector which has been estimated by the gravitational direction vector estimating section 5. Then, the gravitational direction vector (acceleration component) projection calculating section 7 calculates a size of a component of an acceleration vector to be projected onto the gravitational direction vector, which acceleration vector is of acceleration vectors excluding a gravitational acceleration vector (=1 G). Then, the gravitational direction vector (acceleration component) projection calculating section 7 outputs data on the size of the component.

A buffer 8 is a one-dimensional buffer which buffers the data supplied from the gravitational direction vector (acceleration component) projection calculating section 7 and then stores the buffered data. Although buffering is generally achieved by first-in first-out (FIFO), a buffer which maintains a chronological order of data is sufficient. This applies to buffers 15 through 17 and buffers 35 through 37 described below.

A buffer 15 is a one-dimensional buffer for storing data supplied from the acceleration component (X) measuring section 11 and the gravitational direction vector estimating section 5. A buffer 16 is a one-dimensional buffer for storing data supplied from the acceleration component (Y) measuring section 12 and the gravitational direction vector estimating section 5. A buffer 17 is a one-dimensional buffer for storing data supplied from the acceleration component (Z) measuring section 13 and the gravitational direction vector estimating section 5. A buffer 35 is a one-dimensional buffer for storing data supplied from the angular velocity component (X) measuring section 31. A buffer 36 is a one-dimensional buffer for storing data supplied from the angular velocity component (Y) measuring section 32. A buffer 37 is a one-dimensional buffer for storing data supplied from the angular velocity component (Z) measuring section 33.

Based on a projection component stored in the buffer 8, a one-dimensional FFT calculation section 9 subjects sample data of a certain sample data length (e.g. 512 samples) to one-dimensional discrete Fourier transform calculation, so that data in which a frequency domain is converted is obtained. Then, the one-dimensional FFT calculation section 9 outputs the data. Specifically, by carrying out one-dimensional discrete Fourier transform calculation, the one-dimensional FFT calculation section 9 calculates peak frequencies of power spectrums of acceleration components stored in the buffer 8. Note that FIG. 2 shows an example of the power spectrums.

Figure 2:
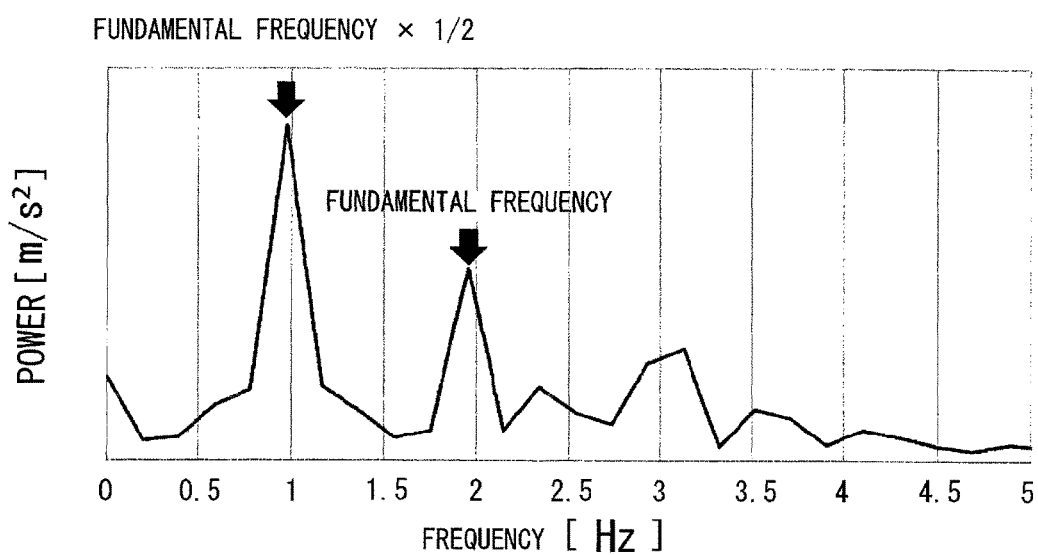
FIG. 2 is a view illustrating a power spectrum of an acceleration component obtained by a one-dimensional FFT calculation section 9 illustrated in FIG. 1.

Note that the power spectrum illustrated in FIG. 2 is defined by (i) a vertical axis which represents power [m/s²] and (ii) a horizontal axis which represents frequency [Hz]. As described later, a walking frequency and phase estimating section 10 estimates a fundamental frequency at 2 Hz, based on the power spectrum.

Meanwhile, in order to accurately decide a frequency by discrete Fourier transform, information concerning a sampling frequency is necessary. Such data can be (i) data stored in the buffer 8 or (ii) data obtained by reading out information which is stored in an external storage device. This applies to one-dimensional FFT calculation sections 19 through 21 and one-dimensional FFT calculation sections 39 through 41 described below.

A one-dimensional FFT calculation section 19 subjects sample data of a certain sample data length to one-dimensional discrete Fourier transform calculation based on data stored in the buffer 15, so that data in which a frequency domain is converted is obtained. Then, the one-dimensional FFT calculation section 19 outputs the data. Likewise, a one-dimensional FFT calculation section 20 subjects sample data of a certain sample data length to one-dimensional discrete Fourier transform calculation based on data stored in the buffer 16, so that data in which a frequency domain is converted is obtained. Then, the one-dimensional FFT calculation section 20 outputs the data. A one-dimensional FFT calculation section 21 subjects sample data of a certain sample data length to one-dimensional discrete Fourier transform calculation based on data stored in the buffer 17, so that data in which a frequency domain is converted is obtained. Then, the one-dimensional FFT calculation section 21 outputs the data. A one-dimensional FFT calculation section 39 subjects sample data of a certain sample data length to one-dimensional discrete Fourier transform calculation based on data stored in the buffer 35, so that data in which a frequency domain is converted is obtained. Then, the one-dimensional FFT calculation section 39 outputs the data. A one-dimensional FFT calculation section 40 subjects sample data of a certain sample data length to one-dimensional discrete Fourier transform calculation based on data stored in the buffer 36, so that data in which a frequency domain is converted is obtained. Then, the one-dimensional FFT calculation section 40 outputs the data. A one-dimensional FFT calculation section 41 subjects sample data of a certain sample data length to one-dimensional discrete Fourier transform calculation based on data stored in the buffer 37, so that data in which a frequency domain is converted is obtained. Then, the one-dimensional FFT calculation section 41 outputs the data.

Based on data obtained by carrying out discrete Fourier transform on an acceleration component in a gravitational direction which data is calculated by the one-dimensional FFT calculation section 9, the walking frequency and phase estimating section 10 estimates a fundamental frequency (walking frequency) of a walking motion.

Note that it is empirical knowledge that a walking frequency falls within a certain numerical range. Therefore, it is possible to estimate that a frequency of a component having greatest power within a numerical range is a walking frequency.

Specifically, in a case where there is a characteristic frequency peak within a cycle of a walking motion of a typical person (one step per approximately 0.3 seconds to 1.6 seconds, that is, 0.7 Hz to 3.0 Hz), it is possible to estimate that a frequency having the frequency peak is a walking frequency. Alternatively, a walking frequency can be determined by the following steps: (i) a walking motion is detected per step in a time domain, so that an approximate walking frequency is obtained, (ii) a frequency peak in a frequency domain, which frequency peak corresponds to the approximate walking frequency, is detected, and (iii) the walking frequency is determined, based on the time intervals of the frequency peak.

After the walking frequency is thus estimated, a phase of a frequency peak of the walking frequency is obtained, and then the phase thus obtained is outputted along with the walking frequency.

A travel direction vector determining section 50 receives (i) data indicative of the walking frequency and the phase which have been supplied from the walking frequency and phase estimating section 10, (ii) pieces of data supplied from the respective of the one-dimensional FFT calculation sections 19 through 21 and the one-dimensional FFT calculation sections 39 through 41, which pieces of data are obtained by carrying out discrete Fourier transform, and (iii) the gravitational direction vector which has been supplied from the gravitational direction vector estimating section 5. Then, the travel direction vector determining section 50 determines a travel direction vector of a moving body by a method described later.

The following description will discuss the details of an operation of the travel direction estimating device illustrated in FIG. 1.

Figure 3:
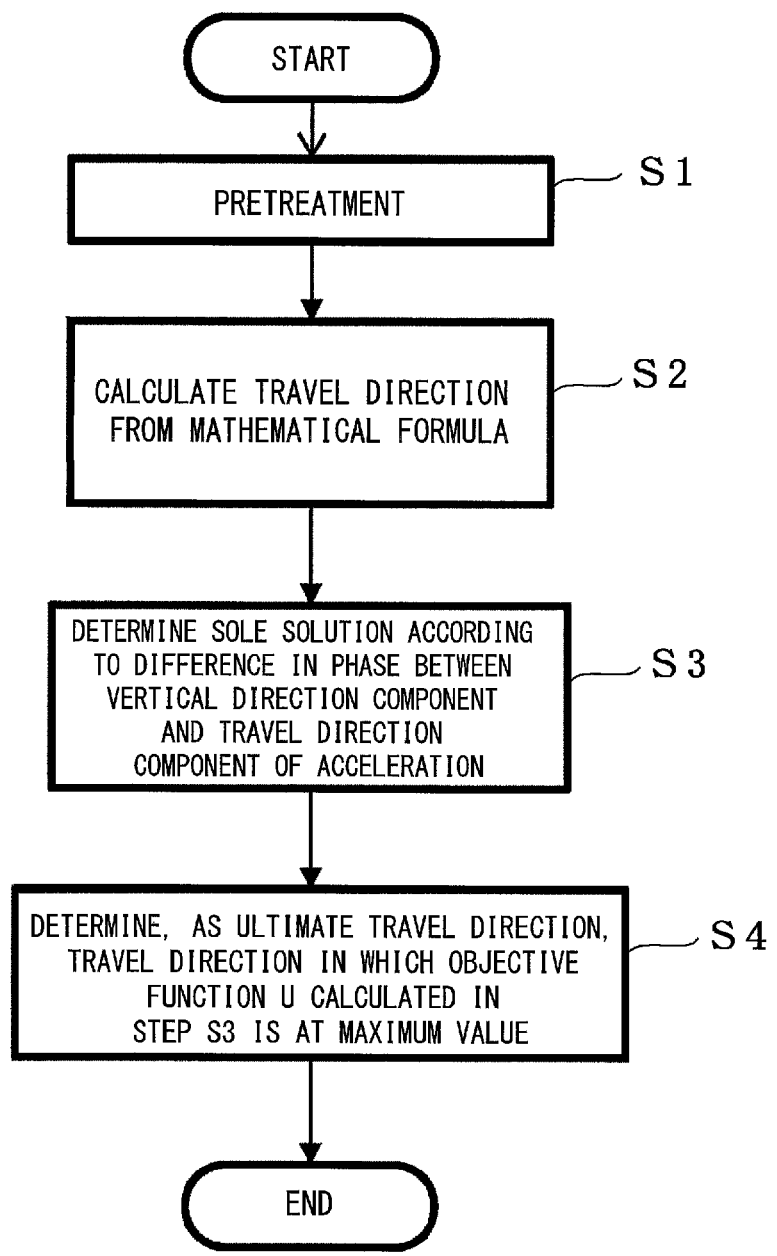
FIG. 3 is a flow chart illustrating an operation of a travel direction estimating device illustrated in FIG. 1.

FIG. 3 is a flow chart illustrating an operation of the travel direction estimating device. As illustrated in FIG. 3, the travel direction estimating device carries out a pretreatment in a step S1. The pretreatment will be described in detail below with reference to FIG. 4.

Figure 4:
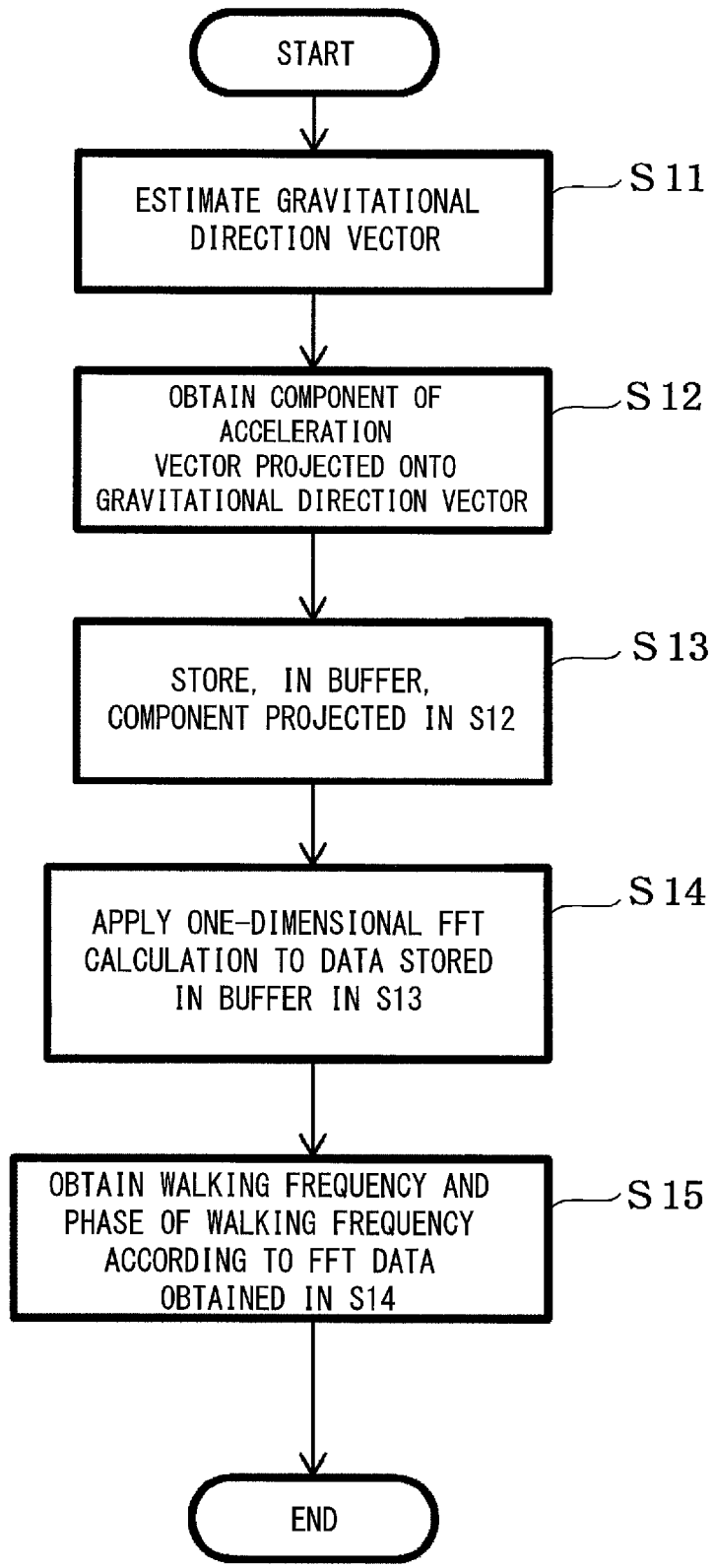
FIG. 4 is a flow chart illustrating a pretreatment in a step S1 illustrated in FIG. 3.

As illustrated in FIG. 4, the gravitational direction vector estimating section 5 estimates a gravitational direction vector as described above in a step S11. Then, in a step S12, the gravitational direction vector (acceleration component) projection calculating section 7 obtains a component of an acceleration vector projected onto a gravitational direction vector.

Then, in a step S13, the buffer 8 stores, in a buffer thereof, the component obtained in the step S12. Then, in a step S14, the one-dimensional FFT calculation section 9 applies one-dimensional FFT calculation to the data stored in the buffer 8 in the step S13. Then, based on data (FFT data) obtained by the calculation in the step S14, the walking frequency and phase estimating section 10 obtains a walking frequency and a phase of the walking frequency in a step S15.

The travel direction estimating device is configured so that, after the pretreatment thus described ends, the travel direction vector determining section 50 calculates a travel direction by use of a mathematical formula in a step S2 illustrated in FIG. 3. A method of thus calculating the travel direction will be described in detail below with reference to FIG. 5. Note that all of operations illustrated in FIG. 5 are carried out by the travel direction vector determining section 50.

Figure 5:
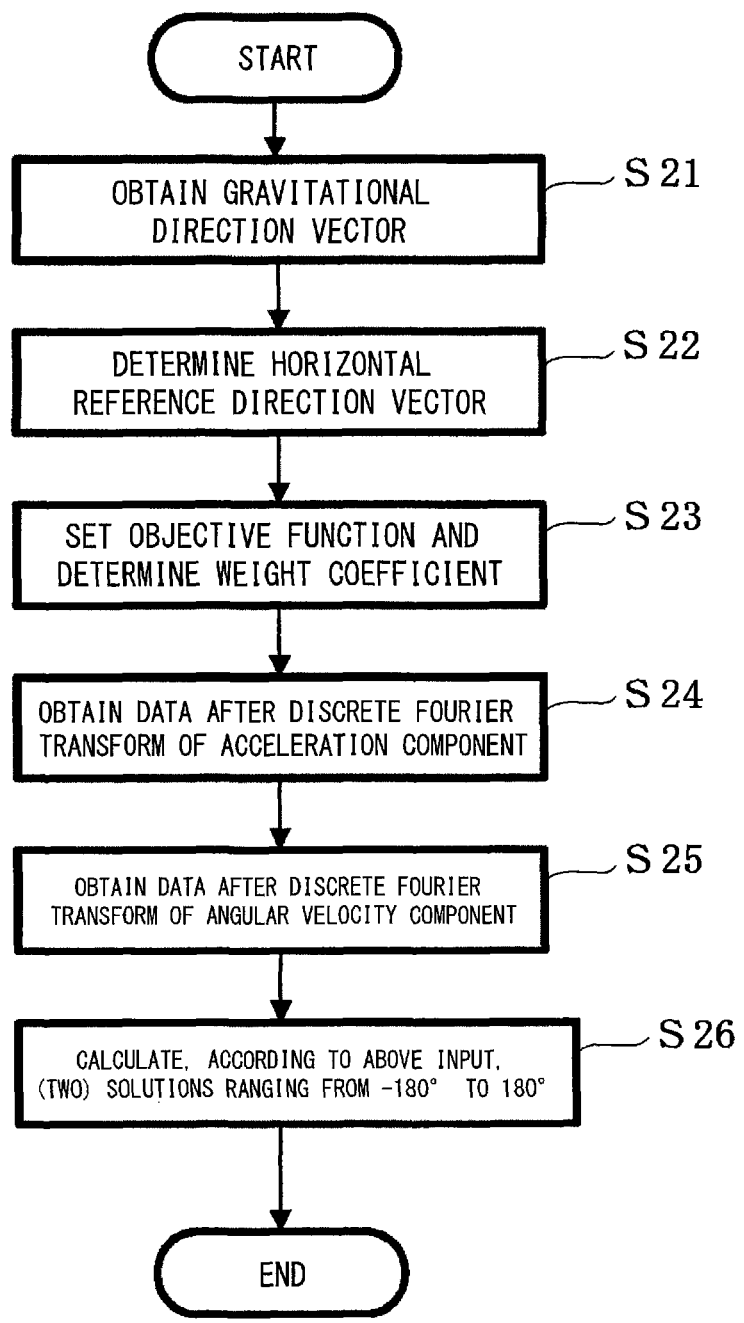
FIG. 5 is a flow chart illustrating a calculation method in a step S2 illustrated in FIG. 3.

As illustrated in FIG. 5, in a step S21, the travel direction vector determining section 50 obtains, from the gravitational direction vector estimating section 5, a gravitational direction vector which has been estimated. Then, in a step S22, the travel direction vector determining section 50 determines, as a horizontal reference direction vector, a single unit vector which is orthogonal to the gravitational direction vector obtained in the step S21. Then, in a step S23, the travel direction vector determining section 50 sets an objective function and determines a weight coefficient in the objective function. An operation in the step S23 will be described in detail below.

First, in order to estimate a travel direction, the travel direction vector determining section 50 sets an objective function $U(\theta)$ represented by following mathematical formula (1).

[Math. 1]

$$U(\theta) = w_a U_a(\theta) + w_\omega U_\omega(\theta) \quad (1)$$

Note that a sub-objective function $U_a(\theta)$, which is the first item on the right-hand side of the mathematical formula (1), is represented by the following mathematical formula (2).

[Math. 2]

$$\begin{aligned}U_a(\theta) = \\ w_{f,a}(v_x(\theta)\text{Re}(A_x(\omega_b)) + v_y(\theta)\text{Re}(A_y(\omega_b)) + v_z(\theta)\text{Re}(A_z(\omega_b)))^2 + \\ (v_x(\theta)\text{Im}(A_x(\omega_b)) + v_y(\theta)\text{Im}(A_y(\omega_b)) + v_z(\theta)\text{Im}(A_z(\omega_b)))^2) + \\ w_{s,a}(v_x(\theta+\pi/2)\text{Re}(A_x(\omega_h)) + v_y(\theta+\pi/2)\text{Re}(A_y(\omega_h)) + \\ v_z(\theta+\pi/2)\text{Re}(A_z(\omega_h)))^2 + (v_x(\theta+\pi/2)\text{Im}(A_x(\omega_h)) + \\ v_y(\theta+\pi/2)\text{Im}(A_y(\omega_h)) + v_z(\theta+\pi/2)\text{Im}(A_z(\omega_h)))^2)\end{aligned} \quad (2)$$

Note also that a sub-objective function $U_\omega(\theta)$, which is the second item on the right-hand side of the mathematical formula (1), is represented by the following mathematical formula (3).

[Math. 3]

$$\begin{aligned}U_\omega(\theta) = \\ w_{f,\omega}((v_x(\theta)\text{Re}(W_x(\omega_h)) + v_y(\theta)\text{Re}(W_y(\omega_h)) + v_z(\theta)\text{Re}(W_z(\omega_h)))^2 + \\ (v_x(\theta)\text{Im}(W_x(\omega_h)) + v_y(\theta)\text{Im}(W_y(\omega_h)) + v_z(\theta)\text{Im}(W_z(\omega_h)))^2) + \\ w_{s,\omega}((v_x(\theta+\pi/2)\text{Re}(W_x(\omega_b)) + v_y(\theta+\pi/2)\text{Re}(W_y(\omega_b)) + \\ v_z(\theta+\pi/2)\text{Re}(W_z(\omega_b)))^2 + (v_x(\theta+\pi/2)\text{Im}(W_x(\omega_b)) + \\ v_y(\theta+\pi/2)\text{Im}(W_y(\omega_b)) + v_z(\theta+\pi/2)\text{Im}(W_z(\omega_b)))^2)\end{aligned} \quad (3)$$

Figure 6:
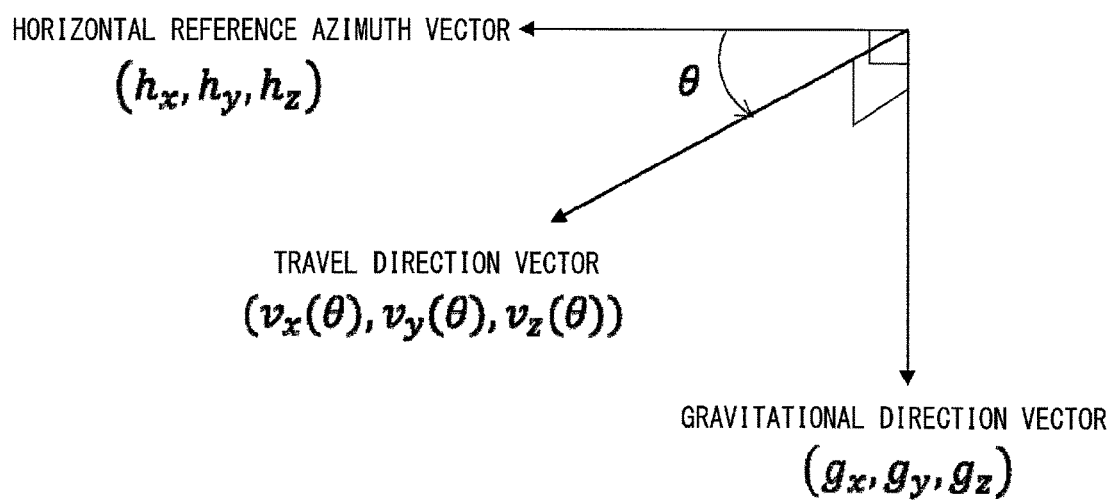
FIG. 6 is a view illustrating positions of a horizontal reference azimuth vector, a travel direction vector, and a gravitational direction vector in relation to each other.

Note that in the mathematical formulas (2) and (3), $v_x$, $v_y$, and $v_z$ represent respective travel direction vectors which are orthogonal to gravitational direction vectors $g_x$, $g_y$, and $g_z$, respectively. FIG. 6 illustrates positions of these vectors in relation to each other.

Note that as illustrated in FIG. 6, it can be hypothesized that a travel direction vector and a gravitational direction vector are orthogonal to each other due to characteristics of a walking motion of a person. It is assumed that horizontal reference azimuth vectors $h_x$, $h_y$, and $h_z$ are any ones selected from unit vectors which are orthogonal to a gravitational direction vector.

Note also that in the mathematical formulas (2) and (3), (i) $\omega_b$ represents an angular frequency corresponding to a walking frequency, (ii) $\omega_h$ represents an angular frequency corresponding to a frequency which is ½ of a walking frequency, (iii) A represents an acceleration, (iv) W represents an angular velocity, (v) Re represents a real number portion, and (vi) Im represents an imaginary number portion.

Note that each of components of travel direction vectors $v_x$, $v_y$, and $v_z$ can be represented by the following mathematical formula (4) which uses Rodrigues' rotation formula.

[Math. 4]

$$\begin{cases} v_x(\theta) = h_x\cos\theta + (-h_y g_z + h_z g_y)\sin\theta \\ v_y(\theta) = h_y\cos\theta + (-h_x g_z - h_z g_x)\sin\theta \\ v_z(\theta) = h_z\cos\theta + (-h_y g_y + h_y g_x)\sin\theta \end{cases} \quad (4)$$

Likewise, in the mathematical formulas (2) and (3), each of components of lateral direction vectors $v_x(\theta+\pi/2)$, $v_y(\theta+\pi/2)$, and $v_z(\theta+\pi/2)$, each of which is orthogonal to a travel direction vector, can be represented by the following mathematical formula (5).

[Math. 5]

$$\begin{cases} v_x(\theta+\pi/2) = (-h_y g_z + h_z g_y)\cos\theta - h_x\sin\theta \\ v_y(\theta+\pi/2) = (h_x g_z - h_z g_x)\cos\theta - h_y\sin\theta \\ v_z(\theta+\pi/2) = (-h_x g_y + h_y g_x)\cos\theta - h_z\sin\theta \end{cases} \quad (5)$$

Note that the mathematical formulas (4) and (5) indicate that a component of a travel direction vector and components of lateral direction vectors orthogonal to the travel direction are each expressed by the sum of a sine function and a cosine function.

In general, the objective function U can be set to a function which allows a travel direction to be precisely estimated even in a case where there are differences among individual objects/persons as moving bodies and/or where there is a change in circumstances. The process of setting the objective function U(θ) shown in the mathematical formula (1) will be describe in detail below.

As shown in the mathematical formulas (1) through (3), the objective function U(θ) has the following six weight coefficients. The six weight coefficients are: (i) a weight coefficient $w_a$ of the sub-objective function Ua(θ) for an acceleration component, (ii) a weight coefficient $w_\omega$ of the sub-objective function Uω(θ) for an angular velocity component, (iii) a weight coefficient $w_{f,a}$ of a travel direction component (component around a roll axis), which weight coefficient $w_{f,a}$ is included in the sub-objective function Ua(θ) for an acceleration component, (iv) a weight coefficient $w_{s,a}$ of the travel direction component (component around a pitch axis), (v) a weight coefficient $w_{f,\omega}$ of a travel direction component (component around a roll axis), which weight coefficient $w_{f,\omega}$ is included in the sub-objective function Uω(θ) for an angular velocity component, and (vi) a weight coefficient $w_{s,\omega}$ of the travel direction component (component around a pitch axis).

It is known that an acceleration component becomes dominant as a characteristic of a movement during an ordinary walking motion. Therefore, it is possible to obtain an analytic solution where, in the mathematical formula (1), (i) the weight coefficient $w_a$ for an acceleration component is 1 and (ii) the weight coefficient $w_\omega$ for an angular velocity component is 0.

Such a method makes it unnecessary to carry out, for example, a calculation such as discrete Fourier transform of an angular velocity component. This allows a process of estimating a travel direction to be simple, and accordingly allows for a reduction in calculation cost.

The weight coefficient $w_{f,a}$ and the weight coefficient $w_{s,a}$ are each a coefficient for normalizing and adding together a travel direction component of and a lateral direction component of an acceleration. In a case where, for example, a coefficient of a component, which generates only a small amplitude, is set to a large value, it is possible to cause a characteristic of the component to be properly reflected in a motion. Likewise, the weight coefficient $w_{f,\omega}$ and the weight coefficient $w_{s,\omega}$ are each a coefficient for normalizing and adding together a travel direction component of and a lateral direction component of an angular velocity. In a case where, for example, a coefficient of a component, which generates only a small amplitude, to a large value, it is possible to cause a characteristic of the component to be reflected in a motion.

Then, in a step S24 illustrated in FIG. 5, the travel direction vector determining section 50 obtains, from the one-dimensional FFT calculation sections 19 through 21, respective pieces of data which are obtained after discrete Fourier transform of acceleration components (of three axes).

Then, in a step S25, the travel direction vector determining section 50 obtains, from the one-dimensional FFT calculation sections 39 through 41, respective pieces of data which are obtained after discrete Fourier transform of angular velocity components (of three axes). Then, in a step S26, the travel direction vector determining section 50 analytically calculates two solutions ranging from −180° to 180° where the objective function U(θ) is at a maximum value. The travel direction vector determining section 50 thus analytically calculates the two solutions by use of a mathematical formula (8) below, based on (i) the gravitational direction vector obtained in the step S21, (ii) a result of discrete Fourier transform of the acceleration components (of three axes), which result was obtained in the step S24, (iii) a result of discrete Fourier transform of the angular velocity components (of three axes), which result was obtained in the step S25, (iv) a result of estimating a walking frequency, based on the acceleration components of the gravitational direction, which result was supplied from the walking frequency and phase estimating section 10, and (v) a phase of a walking frequency component which has been supplied from the walking frequency and phase estimating section 10 and which has been obtained as a result of discrete Fourier transform of the acceleration components of the gravitational direction.

Specifically, since components of a travel direction vector and of lateral direction vectors can each be expressed by the sum of a sine function and a cosine function as described above, it should be noted that the objective function U(θ) represented by the mathematical formula (1) can also be expressed as shown in the following mathematical formula (6).

[Math. 6]

$$U(\theta) = (a\cos\theta + b\sin\theta)^2 \quad (6)$$
$$= \frac{(a^2+b^2)}{2}\sin(2\theta + \gamma) + \frac{(a^2+b^2)}{2}$$

Note that objective function U(θ) in the mathematical formula (6) is at a maximum value of $(a^2+b^2)$ in a case where the parameter θ satisfies a relationship shown in the following mathematical formula (7).

[Math. 7]

$$2\theta + \gamma = \frac{\pi}{2} + 2n\pi \quad (7)$$

$\left(n \text{ is any integer, and } \gamma = \tan^{-1}\left(\frac{b}{a}\right), \text{ provided that } a \neq 0, \text{ in a case where } a = 0, \frac{\pi}{2} \text{ or } \left(-\frac{\pi}{2}\right) \text{ can be applied.}\right)$ By solving the mathematical formula (7) for θ, the following mathematical formula (8) can be obtained.

[Math. 8]

$$\theta = \frac{\pi}{4} - \frac{\gamma}{2} + n\pi \quad (8)$$

$\left(\gamma = \tan^{-1}\left(\frac{b}{a}\right), \text{ provided that } a \neq 0, \text{ in a case where } a = 0, \frac{\pi}{2} \text{ or } \left(-\frac{\pi}{2}\right) \text{ can be applied.}\right)$ In a case where the mathematical formula (8) is solved under constraint conditions of $-\pi < \theta \leq \pi$, two solutions for θ can be obtained. The two solutions express respective of (i) a traveling direction of a moving body and (ii) a direction opposite the traveling direction.

In view of the above, calculating coefficients a and b of the cosine function and the sine function in the mathematical formula (6) allows the two solutions to be calculated by use of the mathematical formula (8).

However, even in a case where a solution of a travel direction is restricted to a range of −180° to 180° as described earlier, there exist two solutions of the mathematical formula (8). It is therefore not possible to determine a sole travel direction. That is, as described above, one solution of the mathematical formula (8) indicates a correct travel direction (traveling direction), whereas the other solution indicates a direction opposite the travel direction (opposite direction).

Therefore, in a step S3 illustrated in FIG. 3, the travel direction vector determining section 50 determines the correct travel direction by (i) obtaining a phase of a walking frequency component of an acceleration component projected in the travel direction, the phase being obtained based on (a) a phase, supplied from the walking frequency and phase estimating section 10, of a walking frequency component of an acceleration component projected in a gravitational direction and (b) the solution calculated in the step S2, (ii) analyzing whether or not a difference between the phase of the walking frequency component of the acceleration component projected in the travel direction and the phase of the walking frequency component of the acceleration component projected in the gravitational direction falls within a certain numerical range, and (iii) identifying θ, which falls within the numerical range, as a sole solution indicative of the correct travel direction. Note that it is empirical knowledge that in a case where a movement of a moving body is a walking motion of a person, the "certain numerical range" should be set to approximately −45° to 135°.

Alternatively, the difference between the phases can be calculated by a method in which a cross-correlation function of both the components is to be obtained.

Then, in a step S4, the travel direction vector determining section 50 determines that a travel direction is ultimately a travel direction in which the objective function U calculated in the step S3 is a maximum value.

Specifically, the travel direction vector determining section 50 calculates the travel direction vector by substituting, in the mathematical formula (4), the solution which has been determined as a sole solution in the step S3.

Note that the travel direction vector determining section 50 provides the travel direction vector, which has been thus calculated, to other circuit(s) and/or device(s) (not illustrated) which need information regarding the travel direction vector.

Note also that a maximum value of an objective function U obtained analytically can be used for evaluation of reliability of an azimuth of a travel direction indicated by the objective function U. Specifically, in a case where the objective function U is at a maximum value that is sufficiently large, the reliability of the azimuth is high. In a case where the maximum value is not sufficiently large, the reliability of the azimuth can be considered low.

In view of the above, a travel direction estimating device and a travel direction estimating method in accordance with an embodiment of the present invention makes it possible to easily estimate a traveling direction (travel direction) in which a moving body travels. This allows a travel direction to be estimated more efficiently than is the case of a conventional device/method, that is, with reduced calculation cost and at high speed.

According to the travel direction estimating device and the travel direction estimating method in accordance with the embodiment of the present invention, it is possible to obtain the characteristics shown in Table 1 and therefore the advantageous effects of the present invention not only in a case where the device is held by a hand of a person walking with an arm swinging, but also in cases where, for example, (i) the device is placed in a pocket on a leg of a person walking and (ii) the device is placed in a handbag held by a person walking.

REFERENCE SIGNS LIST

1 Accelerometer (three-axis)
3 Angular velocity sensor (three-axis)
9, 19 through 21, 39 through 41 One-dimensional FFT calculation section
50 Travel direction vector determining section

The invention claimed is:

1. A travel direction estimating device for estimating a traveling direction in which a moving body travels, comprising:
 an accelerometer for detecting an acceleration by which the moving body travels, wherein the detected acceleration includes acceleration components of the traveling direction and an orthogonal direction orthogonal to the traveling direction on a horizontal plane;
 an angular velocity sensor for detecting an angular velocity by which the moving body travels, wherein the detected angular velocity includes angular velocity components of the traveling direction and the orthogonal direction; and
 a processor for determining the traveling direction of the moving body by:
  (i) subjecting, to discrete Fourier transform, (a) the acceleration detected by the accelerometer and (b) the angular velocity detected by the angular velocity sensor,
  (ii) calculating, based on the detected acceleration of the moving body and based on the detected angular velocity of the moving body, an objective function by multiplying each of a first objective function and a second objective function by a weight coefficient and then adding together the first objective function and the second objective function together each of which has been thus multiplied,
  wherein the first objective function is obtained by:
   (1) squaring each the following (a) and (b):
    (a) an amplitude of a first frequency component obtained by subjecting a component of the traveling direction of the acceleration to discrete Fourier transform and
    (b) an amplitude of a second frequency component obtained by dividing, in half, the first frequency obtained by subjecting a component of the orthogonal direction of the acceleration to discrete Fourier transform,
   (2) multiplying each of the squared amplitudes by a weight coefficient, and
   (3) adding together the squared amplitudes each of which has been thus multiplied, and
  wherein the second objective function is obtained by:
   (1) squaring each of the following (a) and (b):
    (a) an amplitude of the second frequency component obtained by subjecting the component of the traveling direction of the angular velocity to discrete Fourier transform and
    (b) an amplitude of the first frequency component obtained by subjecting the component of the orthogonal direction of the angular velocity to discrete Fourier transform, (2) multiplying each of the squared amplitudes by a weight coefficient, and
(3) adding together the squared amplitudes each of which has been thus multiplied;
(iii) calculating directions in which the objective function is at a maximum level, and
(iv) selecting the traveling direction from the directions in accordance with a difference in phase between:
(a) a vertical direction component of the acceleration of the moving body and
(b) a component of the traveling direction of the acceleration.

2. A method of estimating a traveling direction of a moving body using (1) an accelerometer to detect acceleration including acceleration components of the traveling direction and an orthogonal direction orthogonal to the traveling direction on a horizontal plane, (2) an angular velocity sensor to detect angular velocity including angular velocity components of the traveling direction and the orthogonal direction, and (3) a processor, the method comprising the steps of:
(A) using the processor to determine an objective function by:
(i) multiplying each of the following (a) and (b) by a weight coefficient:
(a) a first objective function which is a function of the acceleration components detected by the accelerometer and
(b) a second objective function which is a function of the angular velocity components detected by the angular velocity sensor and
(ii) adding together the first objective function and the second objective function each of which has been thus multiplied,
wherein the first objective function is obtained by the processor by:
(i) squaring each the following (a) and (b):
(a) an amplitude of a first frequency component obtained by subjecting a component of the traveling direction of the acceleration to discrete Fourier transform and
(b) an amplitude of a second frequency component obtained by dividing, in half, the first frequency obtained by subjecting a component of the orthogonal direction of the acceleration to discrete Fourier transform,
(ii) multiplying each of the squared amplitudes by a weight coefficient, and
(iii) adding together the squared amplitudes each of which has been thus multiplied; and
wherein the second objective function is obtained by:
(i) squaring each of the following (a) and (b):
(a) an amplitude of the second frequency component obtained by subjecting the component of the traveling direction of the angular velocity to discrete Fourier transform and
(b) an amplitude of the first frequency component obtained by subjecting the component of the orthogonal direction of the angular velocity to discrete Fourier transform,
(ii) multiplying each of the squared amplitudes by a weight coefficient, and
(iii) adding together the squared amplitudes each of which has been thus multiplied
(B) calculating using the processor travel directions of the moving body in which travel directions the objective function is at a maximum value; and
(C) selecting, in accordance with a difference in phase between:
(a) a vertical direction component of the acceleration of the moving body and
(b) a component of the traveling direction of the acceleration, an estimated traveling direction of the moving body from the travel directions calculated in the step (B).

* * * * *